(12) United States Patent
Hecht

(10) Patent No.: US 9,581,030 B2
(45) Date of Patent: Feb. 28, 2017

(54) ULTRA HIGH TEMPERATURE ENVIRONMENTAL PROTECTION COATING

(75) Inventor: Daniel H. Hecht, Fort Worth, TX (US)

(73) Assignee: Lockheed Martin Corporation, Bethesda, MD (US)

(\*) Notice: Subject to any disclaimer, the term of this patent is extended or adjusted under 35 U.S.C. 154(b) by 518 days.

(21) Appl. No.: 13/011,675

(22) Filed: Jan. 21, 2011

(65) Prior Publication Data

US 2012/0189871 A1  Jul. 26, 2012

(51) Int. Cl.
*B05D 3/02* (2006.01)
*F01D 5/28* (2006.01)
*B64C 3/36* (2006.01)
*B64C 11/20* (2006.01)

(52) U.S. Cl.
CPC .............. *F01D 5/288* (2013.01); *B64C 3/36* (2013.01); *B64C 11/205* (2013.01); *F05D 2300/512* (2013.01); *F05D 2300/6033* (2013.01); *Y02T 50/67* (2013.01)

(58) Field of Classification Search
CPC ......... B64C 3/36; B64C 11/205; F01D 5/288; F05D 2300/6033
See application file for complete search history.

(56) References Cited

U.S. PATENT DOCUMENTS

| | | |
|---|---|---|
| 2,763,569 A | 9/1956 | Bradstreet et al. |
| 2,972,529 A | 2/1961 | Alexander et al. |
| 3,110,571 A | 11/1963 | Alexander et al. |
| 3,705,791 A | 12/1972 | Bredzs |
| 3,864,093 A | 2/1975 | Wolfla |
| 3,864,140 A * | 2/1975 | Ferrigno ............... 106/462 |
| 5,820,976 A | 10/1998 | Kamo |

(Continued)

FOREIGN PATENT DOCUMENTS

JP   07330439 A  * 12/1995

OTHER PUBLICATIONS

E. Wuchina, E. Opila, M.Opeka, W. Fahrenholtz, and I. Talmy, UHTCs: Ultra-High Temperature Ceramic Materials for Extreme Environment Applications, The Electrochemical Society Interface, Winter 2007, pp. 30-36.

(Continued)

*Primary Examiner* — Monique Jackson
(74) *Attorney, Agent, or Firm* — Bracewell LLP; Keith R. Derrington

(57) ABSTRACT

An environmental protective coating (EPC) for protecting a surface subjected to high temperature environments of more than 3000 degree F. The coating includes a dense platelet lamellar microstructure with a self-sealing, compliant binder material for holding the platelets together. The platelets may be formed from materials that are resistant to high temperatures and impermeable, such as ceramics. The lamellar microstructure creates a tortuous path for oxygen to reach the surface. The binder material may have free internal volume to increase the strain capability between the platelets and absorb increased volume during operation. The binder may be formed from a material that is softer and has a lower temperature capability than the platelets to provide the system with the required compliance and sealing capability. The binder may have sufficient glass content and glass-forming content for initial and long-term sealing purposes.

15 Claims, 5 Drawing Sheets

Fig 3A

(56) References Cited

U.S. PATENT DOCUMENTS

| | | | |
|---|---|---|---|
| 6,884,524 B2* | 4/2005 | Ackermann et al. | 428/650 |
| 6,977,060 B1 | 12/2005 | Merrill et al. | |
| 7,691,175 B2* | 4/2010 | Shimoda et al. | 75/255 |
| 2005/0208338 A1* | 9/2005 | Fernie et al. | 428/701 |
| 2007/0093587 A1 | 4/2007 | Shen et al. | |
| 2007/0274837 A1 | 11/2007 | Taylor et al. | |
| 2008/0026160 A1 | 1/2008 | Taylor et al. | |
| 2008/0213617 A1 | 9/2008 | Taylor et al. | |
| 2009/0305106 A1 | 12/2009 | Gell et al. | |
| 2013/0209682 A1* | 8/2013 | Massingill et al. | 427/240 |

OTHER PUBLICATIONS

Refractory Pantry, http://inspi.ufl.edu/data.
Peter A. Ciullo, Sara Robinson, Strength and Sheen, Paint & Coatings Industry Magazine, May 2003, pp. 1-7, http://www.rtvanderbilt.com/awards_9.htm.

* cited by examiner

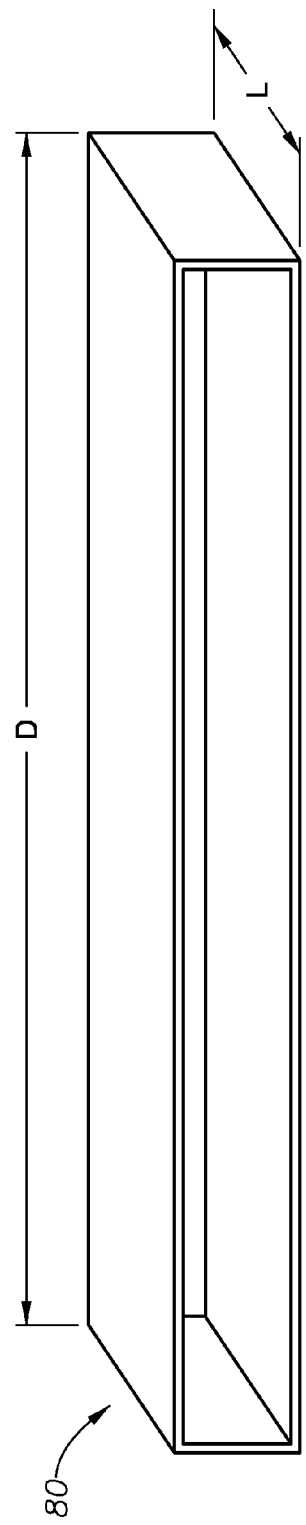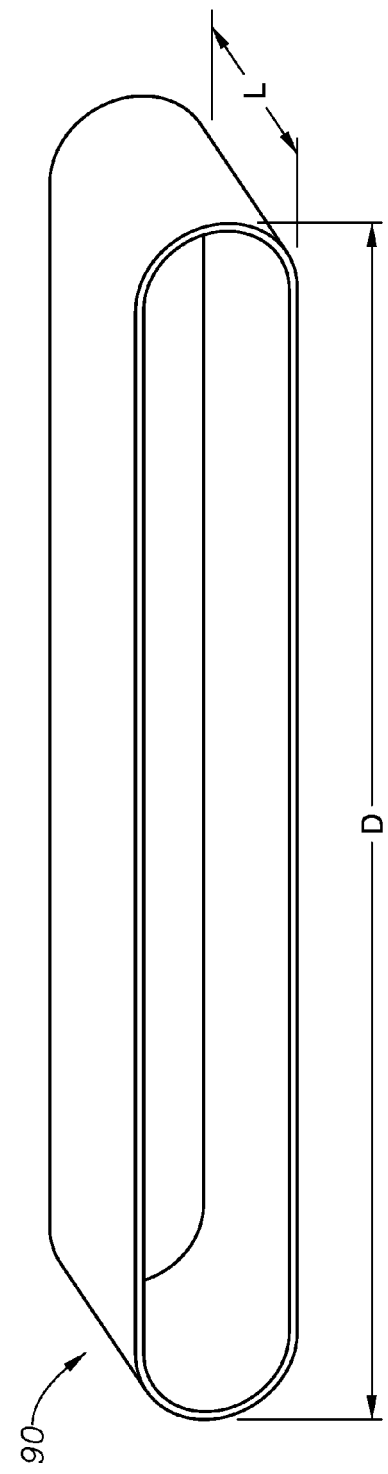
Fig. 9
Fig. 10

ULTRA HIGH TEMPERATURE ENVIRONMENTAL PROTECTION COATING

TECHNICAL FIELD OF THE INVENTION

The present invention relates generally to surface coatings and more particularly, an improved environmental barrier coating to protect a surface subjected to ultra high temperatures and oxidation.

BACKGROUND OF THE INVENTION

It is often necessary to protect high temperature articles with an Environmental Protection Coating (EPC). EPC's have insulative and chemical protection capabilities to protect surfaces from the harsh environment.

EPC's are typically applied to hot sections of gas turbines or jet engines, such as combustor cans, nozzle guide vanes, and turbine blades. One of the functions of these coatings is to increase engine efficiency by elevating the operational temperature or reducing the need for cooling air. The use of thermal barrier coatings in large turbines for land-based power generation is critically necessary for an acceptable operating lifetime. EPC's and cooling mechanisms are often used in turbine systems to protect the metallic parts that comprise turbines. The EPC enables extension of component life and improved reliability by lowering the operating metal temperature, thereby also lowering loss of strength and oxidation. As such, costs are reduced by eliminating elaborate cooling schemes required for metals in high temperature applications. The increased maximum gas temperature permitted by the EPC insulating and chemical protective capabilities provides significant performance improvement and thus large cost savings by increasing the turbine inlet temperatures. Efficiency improvements are thus limited by the capabilities of the EPC applied to turbine parts, such as the blades. Higher temperature EPC's may also enable similar efficiency improvements in small radius hypersonic aircraft leading edges, higher thermal efficiency engine components and exhaust washed surfaces.

The life and performance of high speed aircraft may also be improved by the application of EPC's. As with the turbine blades, the EPC's provide protection from heat and oxidation within the limits of the EPC's. The application of EPC's on forward facing surfaces is especially important for hypersonic aircraft due to the pronounced aero-thermal heating that occurs at those speeds. The operational speed of the wing and thus the aircraft is thus also limited by the capabilities of the EPC applied to the leading edges.

The current EPC's used at temperatures approaching 3000 degrees F. are typically silica-sealed ceramics. Hypersonic edge coatings are typically silica while turbine blades are typically Zirconia based. The ceramic coating may employ refractory oxides, nitrides, borides or carbides, to provide the thermal barrier. Refractory materials may include compounds of Al, Si, Zr, Hf, and Ta, among others. Silicon-based coatings, which oxidize to silica glasses, have capabilities of between 2400 to 3000 degrees F., depending on the lifetime required, can remain effective for up to thousands of hours or for short term single use, respectively. At ultra high temperatures, i.e. above 3000 degrees F., the current EPC's degrade rapidly.

Attempts to develop higher temperature EPC's, however, have been met with various material deficiencies as shown below:

1. Sealant qualities: In order to ensure initial and in-use requirements to impede the ingress of oxygen to the substrate, the coating must be able to form appropriate sealing glasses (oxides) to seal off any cracks, pin-holes or porosity that may develop from chemical activities or physical stresses. Current high temperature EPC's do not provide adequate sealing from oxygen at ambient, intermediate and ultra high temperatures.

2. Compliance: High thermal strains are typically experienced in weak and high modulus EPC ceramics. This strain creates stresses greater than constituent failure strength for high CTE or temperature differential, causing spalling and cracking 3. Volatility: Preferred sealing materials have high vapor pressures at the temperatures of interest; some, like silica, enter a regime of active oxidation and rapidly degrade. Very high internal vapor pressure can push aside viscous sealants creating pin-holes.

4. Mis-matched Coefficient of Thermal Expansion (CTE): Protective coatings expand at a different rate than the substrate when heated and generate very high stresses leading to cracks, pin-holes and spalling.

5. Chemical incompatibility: EPC constituents capable of producing environmentally stable compounds may be reactive with the substrates.

6. Adhesion: Existing EPCs may not adhere well to the substrate.

Attractive compounds exist that may be useful in developing improved EPC's. Inter-metallic MAX phase compounds are ternary carbides and nitrides with the general formula $M_{n+1}AX_n$ (MAX) with n=1-3. M is an early transition metal, A is an A-group element (predominantly IIIA and IVA in the periodic table) and X can be carbon and/or nitrogen. These compounds behave like metals regarding their machinability and their thermal and electrical conductivities but behave like ceramics in terms of stiffness, oxidation resistance, thermal stabilities and high melting points. However, even these attractive materials do not have the breath of properties required for ultra high temperature environments as they are poly-crystalline, develop high thermal stresses, tend towards cracking and oxidation at grain boundaries, providing pathways for oxygen to reach the substrate surface. Use of such materials would require an integrated material engineering solution combining material characteristics in advantageous micro-structures by further processing.

There is thus a continuing and pressing need for improved EPCs so as to advance the efficiency and life of articles subjected to ultra high temperatures.

SUMMARY OF THE INVENTION

In one embodiment of the present invention, an improved EPC is shown for protecting a surface subjected to high temperature environments. The coating can advantageously operate at ultra high temperatures, i.e. more than 3000 degree F. Current EPC's with silica based sealents are deficient at these temperatures because they rapidly degrade due to volatilization and active oxidation. Higher temperature refractory based coatings are brittle and have poor CTE matches to 3000+F substrates leading to sealant failures.

The proposed protective coating may comprise a high temperature, dense platelet nacreous microstructure with a self-sealing, high temperature, compliant binder material for holding the platelets together. Nacreous refers to the similarity in the layering of platelets to that seen in nacre or shells. The platelets may be formed from a refractory oxide, mixed refractory oxides, refractory ceramics, refractory metals or alloys, or inter-metallic MAX phase compounds which generate refractory oxides with a minimum L/D (flat plate dimension/thickness) of five, preferably greater than ten to ensure a tortuous migration path for oxygen.

The binder material may be capable of or have free internal volume in a non-rigid morphology to increase the strain capability between the platelets to accommodate differential thermal expansion. The high strain component may have weak crystalline bonding or complex, ligamentary internal structures oriented significantly normal to the platelets with domain size less than the inter-platelet distance. Large strain capabilities may extend in the plane of the platelets or all directions; strain isotropy is achieved by multi-dimensional strain components or random arrangement of anisotropic strain elements.

The binder may be formulated with a material or oxide forming element(s) that have a softening point significantly lower than the platelets to provide the system with further compliance and sealing capability. Glass formers of sufficient quantity in the binder will soften at operating temperatures enabling flow and capillary wetting to seal coating breaches. Glass creep, or deformation, will allow stress relief between the platelets until the temperature drops below the softening point and reduces the total thermal stress in the coating as it cools.

The EPC of the present invention may also be manufactured, for example, by preparing a skeleton or scaffold from carbon or other fugitive material covered with a refractory material. A binder or mortar can be prepared by converting the refractory material on the fugitive scaffold to an oxide for stable structure and improved sealing. With exposure to heat and/or oxygen, internal volume in the binder can be established by volatizing the fugitive component to allow for strain release. Further, the binder can be processed into a particulate size controlled, smooth paste capable of locating a plurality of platelets at a desired spacing from each other and arranging the platelets into a lamellar structure resembling a brick wall, when viewed in cross-section.

The complete invention consists of an engineered nacreous microstructure providing enhanced arrangement of platelets and high strain binder. Platelets may be physically organized to provide the enhanced arrangement. Chemical modification of the platelets may also be utilized to aid in organization. Locating the edge of one platelet with the center of the adjacent platelets is preferred to maximize the tortuous path through the coating and the strength of the coating. Chemical treatment to create charges or attractive forces of the platelet edges to the center may be used with flat platelets or in addition to shaping to further decrease the tendency of platelets edges to line up through the thickness, creating weak spots in the coating. The platelets consist of low porosity, low permeability refractory material resistant to degradation by oxygen and nitrogen with sufficient length over thickness to produce a tortuous diffusion path; typically with an L/D greater than 5, preferably greater than 10. The strain isolation of the typically high modulus platelets is provided by the weakly bonded and/or very compliant nature of binder constituents held in place with highly viscous glasses which provide cohesion to the coating, further stress relief and persistent sealing of the tortuous diffusion path. The strain isolation capability of the nacreous coating is derived from controlled introduction of free volume. Size reduction, orientation via processing and material formulation of the binder constituents organized into fine, irregular cells with fugitive fractions and low interlaminar strength create the free volume. Heating and oxidizing remove the fugitive components and break weak cleavage bonds of the particulates creating the initial free volume to absorb thermal expansion and allow oxide sealant formation. This combination of materials can be fabricated as a paste or film adhesive.

BRIEF DESCRIPTION OF THE DRAWINGS

FIG. 9 is a perspective view of an alternate geometry for a scaffold used in the manufacturing of an EPC as described in FIGS. 4-6A.

FIG. 10 is a perspective view of an alternate geometry for a scaffold used in the manufacturing of an EPC as described in FIGS. 4-6A.

DETAILED DESCRIPTION OF THE INVENTION

Figure 1:
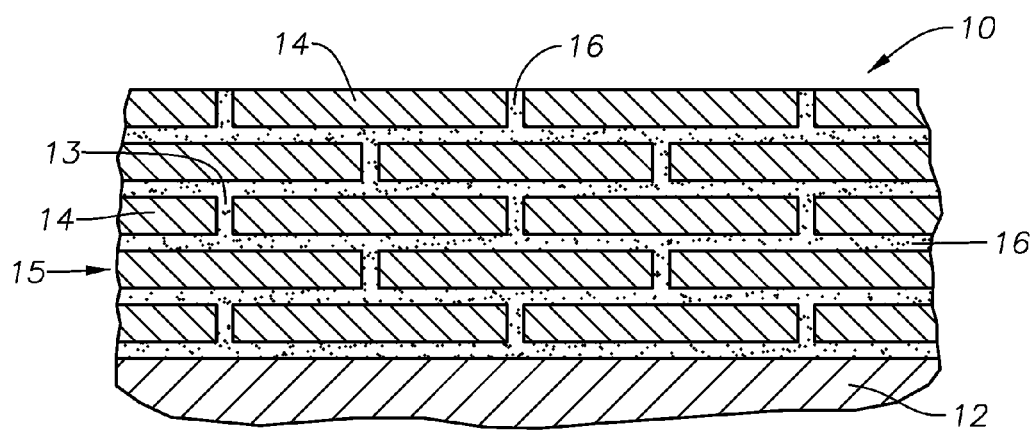
FIG. 1 is a cross sectional, schematic view of an EPC applied to a surface that resists ultra high temperatures and inhibits oxidation of the surface, in accordance with embodiments of the present invention.
Figure 2:
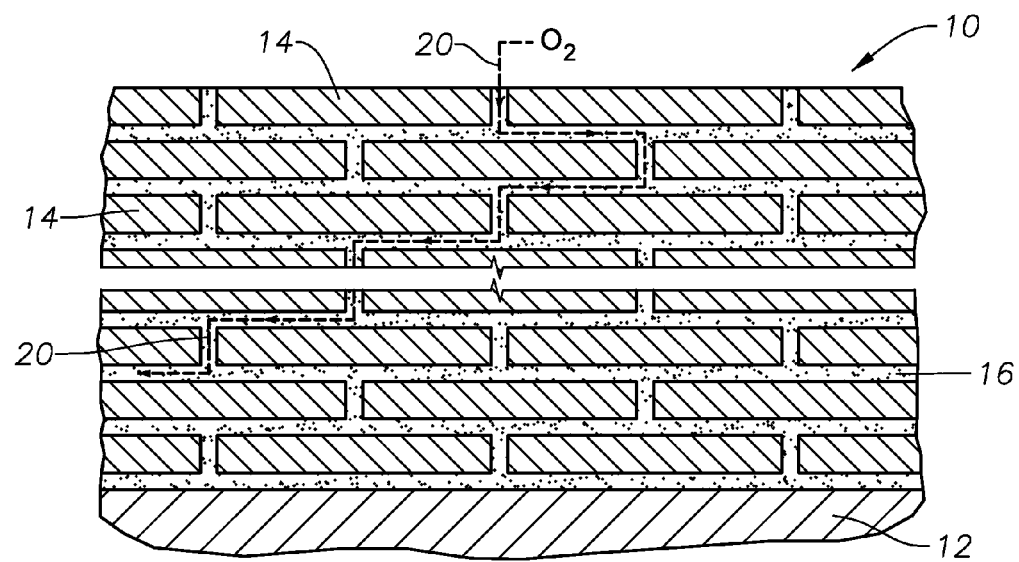
FIG. 2 is a cross sectional, schematic view of the EPC of FIG. 1 showing an example of oxygen migration during operation, in accordance with embodiments of the present invention.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

Referring to FIG. 1, a sectional schematic view of an embodiment of an EPC 10 applied to a surface 12 is shown.

The surface may be, any surface subjected to an ultra high temperature and can include a surface on a vehicle, an aircraft, a water craft, a space craft as well as, a turbine blade surface, exhaust washed surfaces, or an aircraft wing surface subjected to high temperature environments. The EPC 10 is capable of operating at ultra high temperatures, i.e. more than 3000 degree F.

The EPC 10 includes a microstructure of platelets 14 held together by binder material 16. The platelets 14 have a thickness of from about 5 microns to 25 microns, with a length to thickness (L/T) ratio of from 5 to 20, and are resistant to temperatures above 3000 degree F. Optionally, the platelets 14 may be arranged in a lamellar or nacreous fashion, and may further optionally have a coefficient of thermal expansion that ranges from about 50% to about 150% of the thermal expansion of the material of the surface 12. Nacreous refers to the similarity in the layering of platelets to that seen in nacre or shells. In an example embodiment, staggered lamellar or nacreous layering results in spaces 13 between adjacent platelets 14 that are laterally offset from spaces 13 between adjacent platelets 14 in at least a next layer 15 of platelets 14. Optionally, the spaces 13 between adjacent platelets 14 may be offset along multiple layers of platelets 14. The platelets 14 provide structure, strength, and impermeability to the EPC 10 and may be formed from one or a combination of the following: a refractory oxide, mixed refractory oxides, refractory ceramics, refractory metals or alloys, inter-metallic compounds. Specific examples of materials for use in forming the platelets 14 include $ZrB_2$, Ta, Cr, $CrO_2$, $CaO_2$, $MgO_2$, metal nitrides, such as SiN, HfN, TaN, ZrN, ScN, YN, $NB_2N$, NbN, $Be_3N_2$, $Ta_2N$, $Th_3N_2$, VN, $Ba_3N_2$, AlN, UN, TlN, and BN; intermetallic compounds, such as ReW, $Re_{24}T_{15}$, $OsTa_3$, WPl, $IrTa_3$, PtRe, $Ir_3Nb$, $Ir_3Tl$, $HfMo_2$, OsTl, RuTl, $W_2Zr$, $Nb_3Sn$, $RhTa_3$, IrTl, $IrNb_2$, YBl, $Cr_2Ta$, $Be_{13}Zr$, $UBe_{13}$, $Al_2Mo$, $Rh_3Ta$, RuZr, $IrNb_3$, IrTa, $IrNb_3$, $Mo_3Al$, $GeMo_5$, ZrGe, $Zr_2Ge$, $Ir_3Tl$, $Re_3Mo_2$, $OsTa_3$, $Re_3W_2$; silicides such as, $Nb_5Si_3$, $Hf_3Si_2$, $W_5Si_3$, $Zr_5Si_3$, TaSi2, HfSi, $Mo_3Si_2$, $WSi_2$, $Ti_5Si_3$, $Mo_5Si$, $MoSi_2$, ZrSi, $Zr_3Si_2$, $V_5Si_3$, $Zr_2Si$, $Zr_4Si_3$, $Zr_6Si_5$, $Hf_5Si_3$, $Ta_2Si$, and $Ta_5Si_3$; silicates such as $Mg_2SiO_4$, $Ca_2SiO_4$, $BaSiO_4$, $SaSiO_4$, $ZrSiO_3$, $ZrSiO_4$, and $SrSiO_4$; oxides, such as $MgV_2O_4$, $Nd_4SrO3$, $Ca_3TtO_5$, $MgAl_2O_4$, $MgZrO_3$, $Be_3Zr_2O_7$, $Eu_2O_3$, $CaCrO_4$, $Gd_2O_3$, $BeZr_2O_3$, BaThO, $La_2O_3$, $Sn_2O$, $Y_2O_3$, $Yb_2O_3$, $LaHfO_3$, $LaCrO_3$, $Ce_2O_3$, $BaZrO_3$, $SrZrO_3$, $Zr)_2—Eu_2O_3$, $SrHfO_3$, $SrZrO_3$, $HfO_2$, $ThZrO_4$, $ThO_2$, $UO_2$, MgO, $ZrO_2$, $Sr_4Zr_3O_{10}$, CaO, BeO, $Sc2O_3$, $CeCr_2O_5$, SrO, $DyO_2$, $Dy_2O_3$, $CaZrO_3$, $Cr_2O_3$, $PuO_2$, $Pu2O3$, $CaCr_2O_4$, $NiAl_2O_4$, $Al_2O_3$, $La_2MgO_3$, $Al_2BaO_4$, $Al_2NiO_4$, $Cr_2MgO_4$, $Al_2NiO_4$, SiO, HfO, SiO, TiO, and $Al_2SrO_4$; carbides, such as metal carbides, including $BoC_2$, $Ni_3C$, $GdC_2$, $Be_2C$, $YC_2$, $Co_2C$, UC, BC, $Ce_4C$, $Al_4C_3$, MoC, $Mo_2C$, SiC, VC, WC, $NB_2C$, TiC, $W_2C$, $THC_2$, THC, $PrC_2$, $U_2C_3$, $LaC_2$, LaC, $UC_2$, $Co_3C$, $CaC_2$, $SnC_2$, $NdC_2$, $V_2C$, $La_2C_3$, HfC; MAX phase type high temperature compounds, and combinations thereof.

A binder 16 is shown in the spaces between adjacent platelets 14. In an example embodiment, the binder 16 (that may also be referred to as a mortar) is relatively softer than the platelets 14. Optionally, the binder 16 is made up of a binder resin and particulate matter for setting the spacing between the platelets 14. As will be discussed in more detail below, the binder 16 of the present disclosure may include additional additives. In an example embodiment, the platelets 14 can have a Young's modulus of around $5 \times 10^6$ to $60 \times 10^6$ pounds per square inch; the Young's modulus of the binder 16 may range from about 0.1% to about 10% of the Young's modulus of the platelets 14. The binder 16 provides flexibility and toughness to the EPC 10. The composition of the binder 16 will be explained in more detail in a subsequent section.

Figure 3:
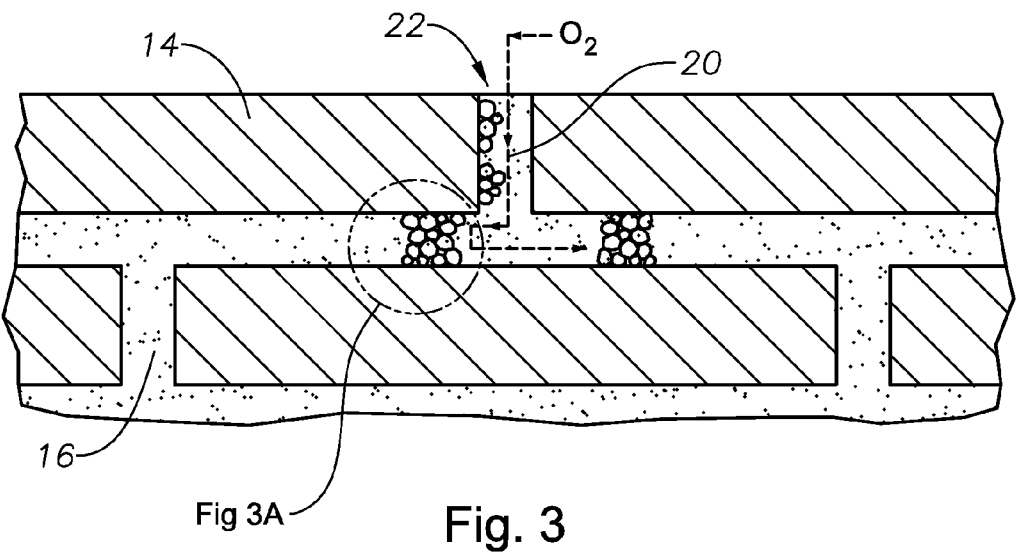
FIG. 3 is a cross sectional, schematic view of the oxide formation in the EPC of FIG. 1, in accordance with embodiments of the present invention.
Figure 3A:
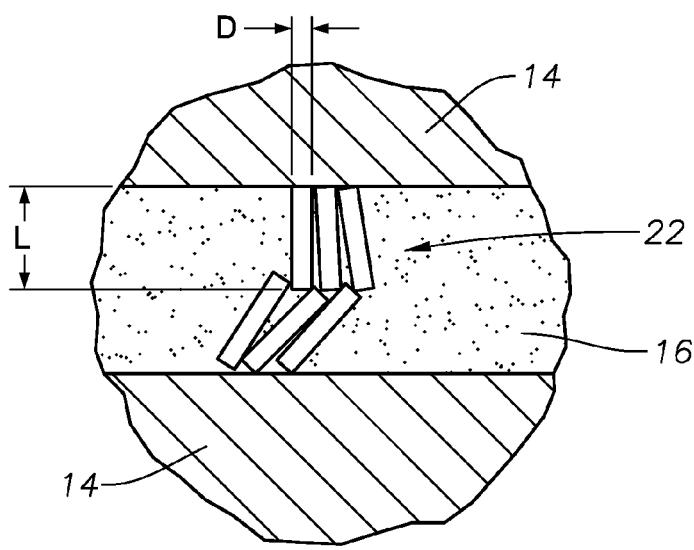
FIG. 3A is an enlarged cross sectional, schematic view of a portion of the oxide formation shown in FIG. 3, in accordance with embodiments of the present invention.

Referring now to FIGS. 3 and 3A, an advantage of the present disclosure is illustrated by how the staggered lamellar arrangement of platelets 14 within the EPC 10 resists oxygen $O_2$ migration to the surface 12 by forming a tortuous path 20 for the oxygen, $O_2$, flowing within the binder 16 and between the platelets 14. Moreover, as shown in FIGS. 3 and 3A, resistance to migration introduced by the tortuous path 20 is further enhanced by disposing oxidizable matter within the binder 16. The oxidizable matter can be made up of refractory metals, intermetallics, metals such as Al, Si, Ti, Ni, Zn, Mg, or un-oxidized constituent materials for use in forming the platelets 14 listed above. When contacted and oxidized by the migrating $O_2$, the volume of the oxidizable matter increases and may possess fluxing abilities expanding, wetting and sealing cracks formed by thermal expansion and thermal volatization of lower temperature refractories, thereby resisting $O_2$ flow through the binder 16. The oxidizable matter can be provided in the binder 16 as particulates, solid solutions, or as a coating on another particulate. In an example embodiment, the oxidizable matter in the binder 16 oxides to form glass oxides 22 when contacted by the migrating oxygen $O_2$. As noted above, the oxides 22 can fill cracks, interstices, and voids in the binder 16 so that the binder 16 becomes a barrier to oxygen $O_2$ flow; making it more difficult for the oxygen $O_2$ to navigate through the binder 16, thereby protecting the surface 12 from oxidation.

The production of oxides 22 by oxidizable elements of EPC 10, phase changes, and thermal expansion of base 12, EPC 10, platelets 14 and binder 16, at operating temperature increase their respective volumes, which can potentially lead to the EPC 10 failing due to differential volume increase and resulting strain buildup. To allow for the increase in volume and provide strain release, the binder 16 includes porous or easily cleaved particulates 42 (FIG. 4) of refractory materials. The particulates 42 (FIG. 4) provide the binder 16 of the EPC 10 with low stress, high strain free volume necessary to accommodate the increased volume due to the oxide growth 20 and thermal strains produced. In an example, high strain deflection is greater parallel to the elongated sides of the platelet 14 to provide maximum strain release in-plane. The platelets 14 together with the micro-structure of the binder 16 result in a tough EPC 10 that can protect a surface 12 from ultra high temperatures and oxidation and provide the flexibility and free volume to accommodate oxide formation and thermal expansion mismatches. In an example embodiment, the free volume locations in the binder 16 are randomly and/or irregularly spaced to thereby introduce multiple degrees of freedom within the EPC 10. The free volume can absorb strain in any direction, thereby correspondingly reducing or eliminating stress (in any direction) in the EPC 10 that might result from the strain.

Figure 4:
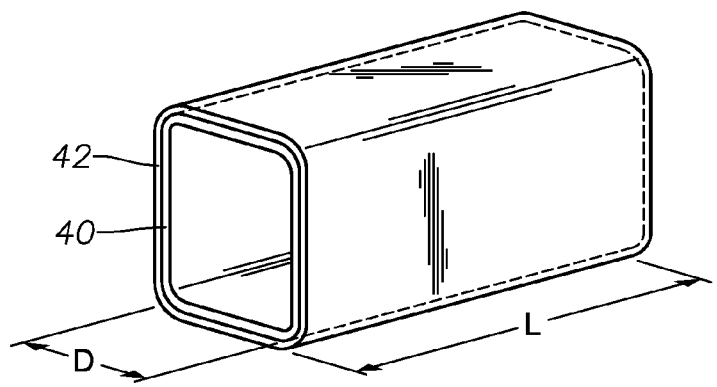
FIGS. 4-6A are schematic views of a process for manufacturing an EPC, in accordance with embodiments of the present invention.
Figure 5:
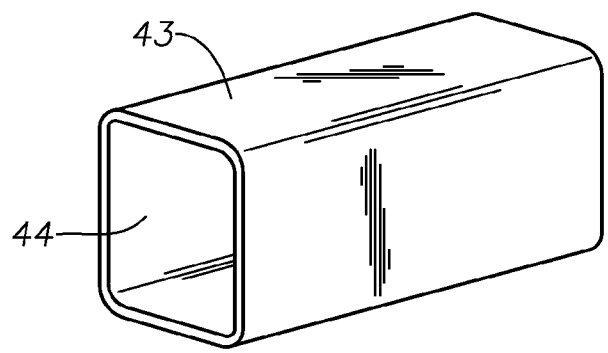
Figure 6:
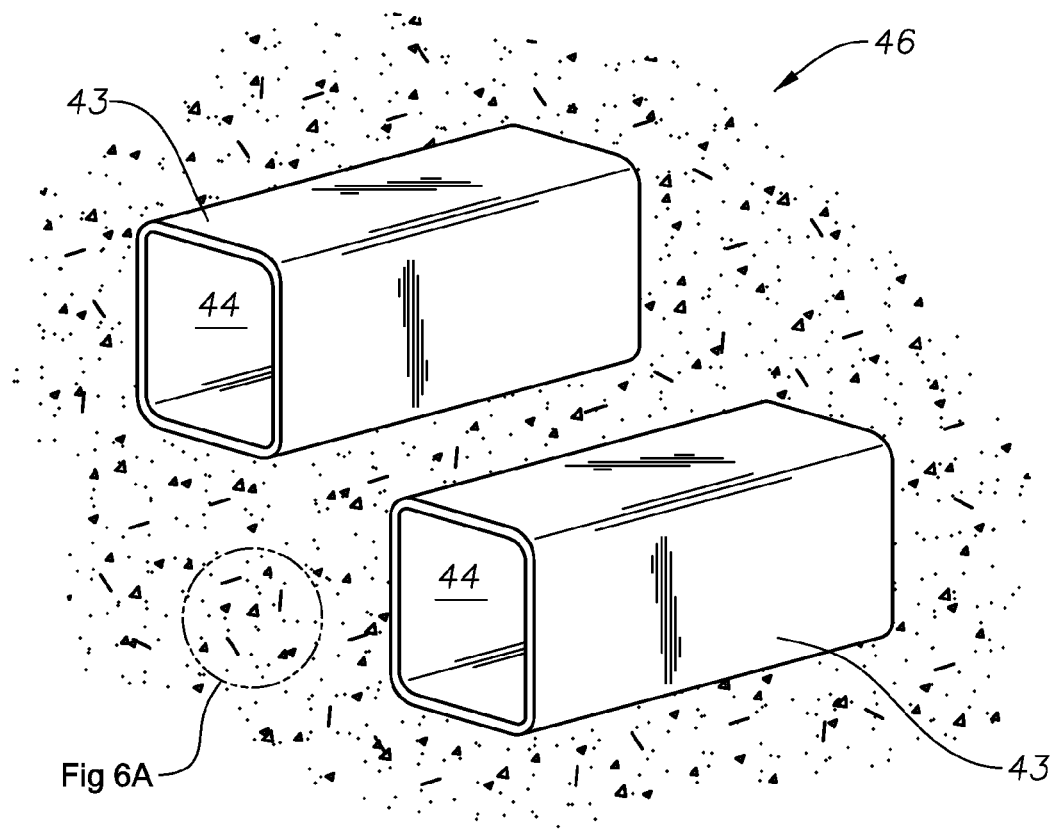

The EPC 10 may be manufactured using various methods. One embodiment of the manufacturing process to produce the EPC 10 is illustrated in FIGS. 4-6. As shown in FIG. 4, the binder material 16 (FIG. 1) can be formulated by utilizing a skeleton or scaffold 40 made from carbon, lower temperature materials of the same candidates for the oxidizable matter within the binder 16, or other volatizable material. The skeleton 40 may be a hollow member made up of particulate matter, preferably with a high aspect cross-section shape for low stiffness in one or more axes and with short length L to depth D (L/D) ratio that has a size in the sub-micron range to allow better processing, as shown in FIG. 4 or alternatively FIGS. 9 and 10. In an example embodiment, the L/D ratio can range from about 1 to about 10, in one embodiment the L/D ratio can range from about 2 to about 5. Once the desired skeleton 40 is provided, the skeleton 40 may be coated with a layer of refractory metal 42, refractory oxide, or their precursors, such as pre-ceramic polymer or vapor deposited components. The refractory layer 42 can then be oxidized while the skeleton 40 is vaporized slowly and allowed to permeate through the refractory layer 42 such that it is removed from the system without damage to the coating. The result is a refractory oxide shell 43 that takes on the general shape of the removed skeleton 40 and that has a hollow space 44 within, as shown in FIG. 5. The hollow space 44 in the shell 43 provides free internal volume in the binder 16 (FIG. 1) that will allow for strain release associated with oxide 20 (FIG. 3) production during operation.

The high strain constituents may include one or two dimensional semi-crystalline or crystalline compounds, fractal morphologies, or constructions of stable and fugitive chemistries, and/or combinations thereof. The materials possess easily strained bonds or free volume with multi-axial or random axial orientation. The free volume is produced during a pre-firing procedure before use which produces thermal shrinkage upon cooling, cleavage of the weak bonds and the free volume desired. Other fugitive components increase the generation of free volume utilized by these cleaved constituents to produce a highly compliant micro-structure. Graphite, zirconia diboride(gr), boron nitride(gr), mica and acicular wollastonite and zirconium mullite are examples of suitable crystalline materials. High intensity ball milling of C(gr) is an example of mechanical forming of sub-micron or nano-platelet compositions with minimal bonding and fugitive character in oxidizing environment. Eutectics can produce very fine, fractal morphologies, some of these compositions have ultra high temperature ceramics and an oxidatively fugitive phase such as a Mo—ZrC system. These constituents produce short range, strain capability as-made or as-pyrolyzed or oxidized, that can be randomly oriented as required to yield planar quasi-isotropic compliance.

Figure 6A:
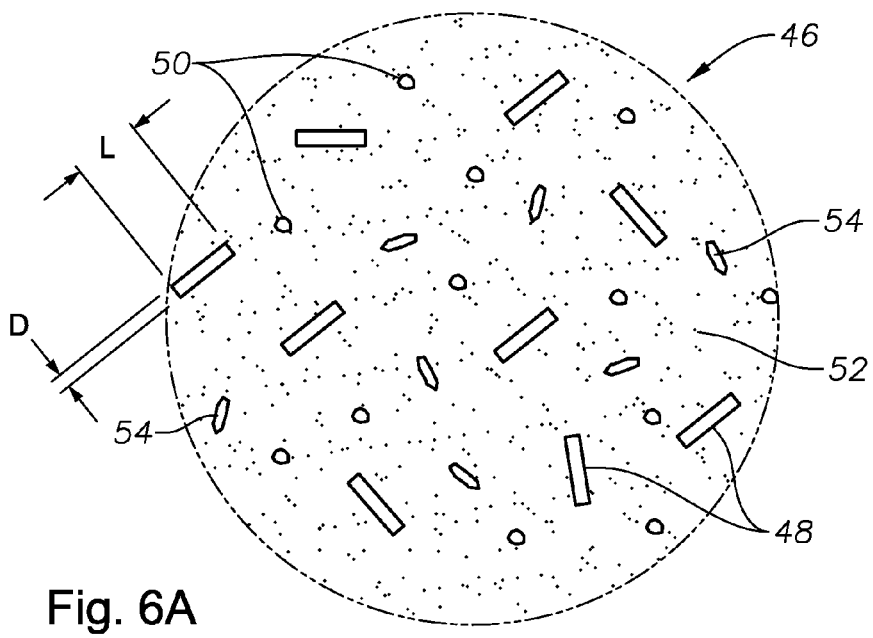

Referring to FIGS. 6 and 6A, the refractory oxide, high aspect ratio shells 43 can then be compounded with a mixture 46 that may include short fibers 48, ceramic mortar 50, sub-micron refractory metal powder 52, and fluxing elements 54. The short fibers 48 may be formed from ceramics or their precursors and have a length/depth ratio less than 20, and optionally less than 10. The ceramic mortar 50 can be made from ceramic binder material; examples of the sub-micron refractory metal powder 52 include Al, Hf, Si, Zr, Ta, Mg, and Ca. The sub-micron refractory metal powder 52 gives the binder 16 (FIG. 1) sealing capability against hot environmental gases via volume expanding oxide formation. The fluxing elements 54 may be anything that induces chemical activity during expected operational conditions, examples of fluxing elements 54 include boron, carbon, silicon, aluminum, titanium, tantalum, phosphorus, or others. Optionally, the fluxing element 54 may include the same candidate materials for the oxidizable matter within the binder 16. In an example embodiment, the fluxing elements 54 are disposed within one or more of the shells 43 and intermixed within the binder 16. In an example of use of this embodiment, the fluxing elements 54 are exposed to temperatures greater than at which they become active or mobile, thereby causing softening and chemical reactions through the binder 16. As such, the fluxing elements 54 are used to enhance wetting, adhesion and sealing of the EPC 10. The mixture 46 is mixed in a ball milled together with the refractory oxide shells 43 into a smooth paste that has the capability of spacing the platelets 14 (FIG. 1) from about 5% to about 100% of the platelet 14 thickness. In an example embodiment the constituent materials 48, 50, 52, 54 making up the paste have a particulate length approximately 50% to about 100% that of the platelets 14 spacing. The resulting paste forms the binder (mortar) material 16 used to hold together the platelets 14.

Figure 7:
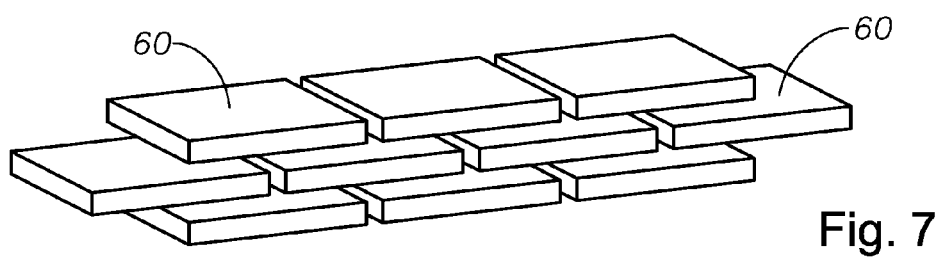
FIG. 7 is a perspective, schematic view of platelet geometry, in accordance with embodiments of the present invention.
Figure 8:
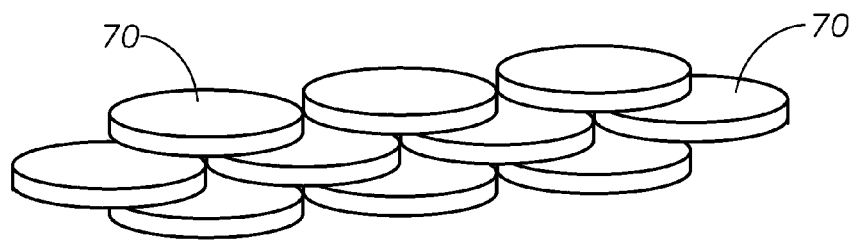
FIG. 8 is a perspective, schematic view of platelet geometry, in accordance with embodiments of the present invention.

Once the binder 16 is prepared, the platelets 14 are added in and mixed thoroughly to wet all surfaces of the platelets 14 with binder 16. Solvents or fugitive resins may be used as necessary to add processability to the fully formulated EPC 10 thereby forming a paste. The EPC 10 paste is applied to the surface 12 (FIG. 1), dried at a rate to minimize gas bubble formation, and is pre-fired to remove low temperature additives and fluxes. The EPC 10 may be fired to near anticipated operating temperature at rates that allow off-gassing of volatile compounds and impurities to proceed by molecular diffusion. The firing temperature can range from 50% to about 100% of expected operating temperature, but will depend on chemistry of the constituents. The platelets may have various geometries. For example, the platelets may be flat plates 60 arranged as shown in FIG. 7 or disks 70 as shown in FIG. 8. Each application of EPC 10 to a surface 12 may have a thickness of from about 0.05 millimeters up to about 0.5 millimeters.

Applying multiple layers of the EPC 10 to the surface 12 (FIG. 1) can provide flexibility in matching performance with materials and allows a certain amount of redundancy for geometry controlled heating. Aero-surfaces geometries and impinging airflow vary significantly, as does the resultant equilibrium temperature due to aero-thermal heating. The substrate is typically a single material with a single maximum use temperature. If no appropriate substrate material is available or a lower temperature material has superior performance, extra EPC thickness can reduce the exposure of the surface 12 to allow its use, especially for sharp radii leading edges. If a single chemistry is not compatible with the increased temperatures and the surface 12 matrix, multiple EPC formulation may be applied in layers to vary the properties to the local environment and improve compatibility. Thus, a family of compatible EPCs 10 may be used to match the maximum temperature of varying geometry and airflow to allow lower temperature materials or severe geometric features. In addition, as EPC 10 recession occurs, a benign failure mode may be achieved as single EPC layer failure does not immediately expose the surface 12. As such, a color-coded system may be used to provide an early warning of degradation. For example, different regions of a blade or hypersonic leading edge on an aircraft wing can have a wide range of temperatures that increases as the radii decreases. The design of EPC system can thus be selected to match the operational temperature due to the radii and airflow and also achieve a benign and inspectable failure mode.

In an example embodiment, the EPC 10 described herein has the high barrier properties of a nacreous or lamellar composite, the toughness of a soft, ceramic binder 16 reinforced with the stiff, strong platelet 14 and the sealing capabilities of a chemical composition which forms stable, viscous oxides 22, with a final volume greater than the original coating constituent to ensure crack sealing. The EPC 10 may be used to retrofit existing applications and repair damaged units. The EPC 10 may be applied to a surface in various ways. For example, the EPC 10 may be applied as a paste or diluted and sprayed onto a surface. A sheet or film of the EPC 10 may also be fabricated that can be adhered to a surface.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method of protecting an oxidative surface of an aircraft comprising:
   a. forming a binder by mixing together ceramic mortar and elongate refractory oxide shells that are hollow and have ends open on opposing sides;
   b. forming a mixture by mixing the binder with refractory material platelets, wherein the mixture has an amount of volatile material;
   c. applying the mixture to the oxidative surface which is selected from the group consisting of a turbine blade surface, an exhaust washed surface, and an aircraft wing surface;
   d. forming a protective layer on the surface by heating the mixture to a temperature so that at least some of the volatile material volatizes to create free volume voids at random locations in the binder; and
   e. operating the aircraft to expose the protective layer to at least 2000° F. thereby inducing a strain in a portion of the layer that is absorbed by the free volume voids to substantially minimize stress in the layer from the induced strain.

2. The method of claim 1, wherein a spacing between adjacent platelets ranges from about 50% to about 100% of the thickness of the platelet.

3. The method of claim 1, further comprising forming the shells by coating a carbon skeleton with a layer of refractory metal, and vaporizing the skeleton thereby leaving the refractory metal.

4. The method of claim 1, wherein the platelets have a coefficient of thermal expansion that ranges from 50% to 150% of a material of the surface.

5. The method of claim 4, further comprising disposing a fluxing agent in the refractory shell that volatizes during step (d).

6. The method of claim 1, further comprising providing an additive to the binder selected from the group consisting of ceramic fibers, a sub-micron refractory metal powder, oxidative materials, fluxing agents, and combinations thereof.

7. The method of claim 6, wherein the additive has a particulate length approximately 50% to about 100% that of the width of spaces between the platelets.

8. The method of claim 1, wherein prior to step (d), the mixture is dried at a rate to minimize gas bubble formation.

9. The method of claim 1, wherein the platelets comprise a substance having a material selected from the group consisting of a refractory oxide, mixed refractory oxide, refractory ceramic, refractory metal, metal nitride, metal oxide, silicate, metal carbide, refractory alloy, intermetallic compound, MAX phase ternary carbide, and combinations thereof.

10. The method of claim 1, wherein an in-situ repair of a sealing function of the protective layer occurs as oxidizable constituents in the mixture expand and form a barrier to oxygen migration in the binder and between platelets; and fluxing constituents provide wetting to fill cracks in the protective layer.

11. The method of claim 1, wherein the binder has a modulus of elasticity that is from 0.1% to 10% of a modulus of elasticity of the platelets.

12. The method of claim 1, wherein the binder comprises a binder resin and oxidizable particulate matter.

13. The method of claim 1, wherein the binder comprises fluxing agents that are exposed to a temperature greater than an expected operating temperature.

14. The method of claim 1, further comprising adding ceramic fibers to the binder that have a length to depth ratio of less than ten.

15. The method of claim 1, wherein the shells have length to depth ratios that range from two to five.

* * * * *